United States Patent [19]

Hurt et al.

[11] 4,189,233
[45] Feb. 19, 1980

[54] PASSIVE OPTICAL RANGE SIMULATOR DEVICE

[75] Inventors: Fred S. Hurt, Ellicott City; Michael A. Cross, Severna Park, both of Md.

[73] Assignee: Westinghouse Electric Corp., Pittsburgh, Pa.

[21] Appl. No.: 775,061

[22] Filed: Mar. 7, 1977

[51] Int. Cl.$^2$ ............................ G01C 3/08; G01J 1/02
[52] U.S. Cl. ..................................... 356/5; 350/96.18; 350/276. SL; 356/243
[58] Field of Search ............................ 356/5, 72, 243; 350/96.11, 96.18, 276 SL, 290, 314, 171, 172, 173

[56] References Cited

U.S. PATENT DOCUMENTS

| | | | |
|---|---|---|---|
| 2,819,459 | 1/1958 | Dodd | 350/276 SL |
| 3,675,344 | 7/1972 | Will iams | 350/171 |
| 3,984,157 | 10/1976 | Levantine | 350/276 SL |
| 4,068,952 | 1/1978 | Erbert et al. | 856/5 |

Primary Examiner—S. C. Buczinski
Attorney, Agent, or Firm—J. B. Hinson

[57] ABSTRACT

An improved passive optical range simulator device which can be used to test the ranging function of an optical radar ranger system having parallel beams leaving and entering. An adapter member provides for mechanical coupling and optical alignment of the simulator device with the ranger system. A focusing lens transforms parallel beams entering and leaving the ranger system into focused beams entering and leaving one end of a coil of optical fiber having a mirror at its opposite end to act as an optical delay medium. A primary tilted-glass-element optical attenuator limits optical energy allowed to reach the optical fiber entrance face, while defecting first surface reflection away from ranger system input. A removable attenuator assembly having oppositely-tilted flat glass elements at the fiber entrance face permits, by substitution, fine adjustment of beam attenuation. An X-Y-Z translation assembly for the fiber entrance face, together with a light source at the opposite end of the fiber, provides for proper alignment with the focused beams.

2 Claims, 1 Drawing Figure

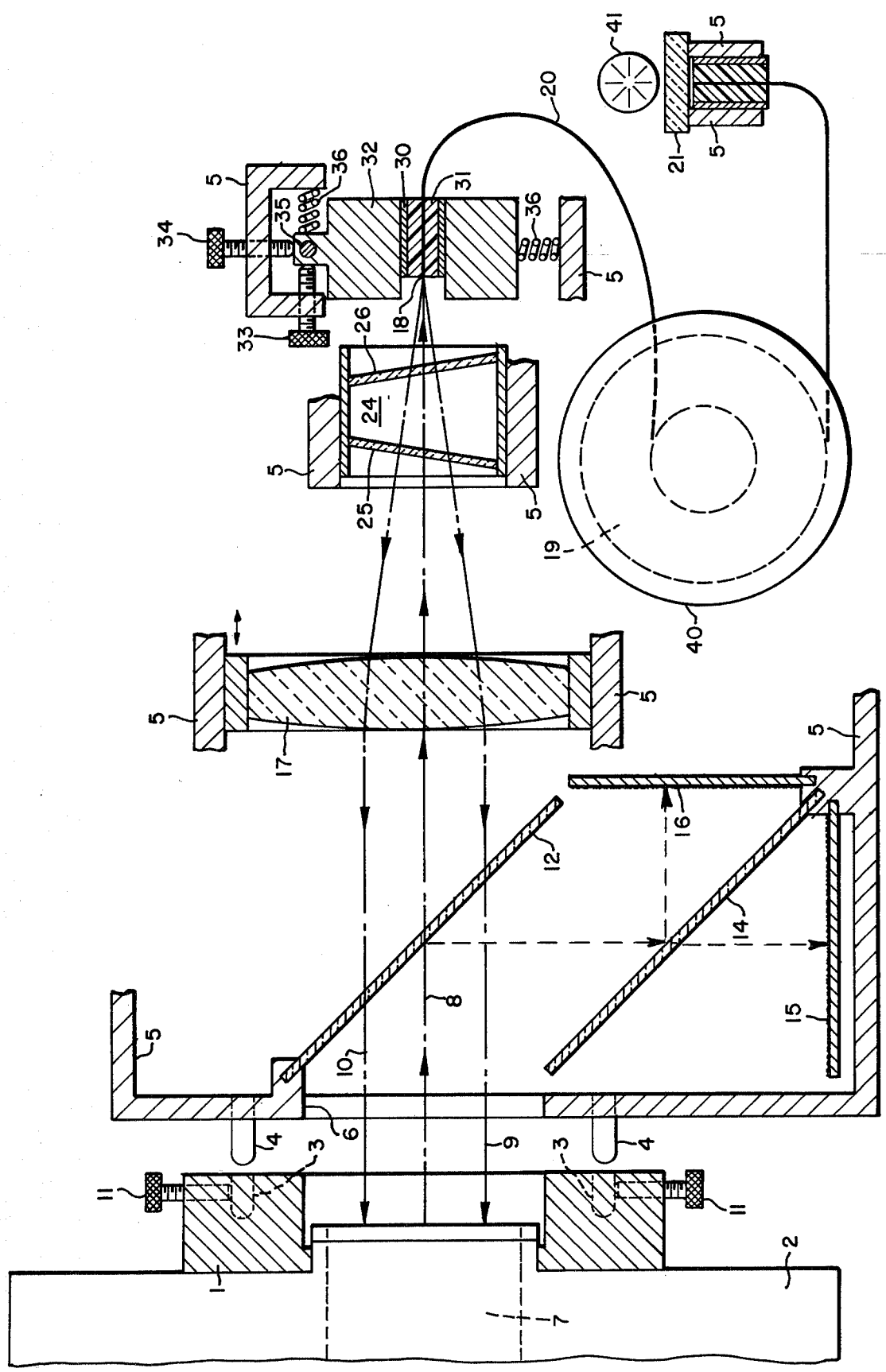

PASSIVE OPTICAL RANGE SIMULATOR DEVICE

BACKGROUND OF THE INVENTION

1. Field of the Invention

An optical range simulator device.

2. Description of the Prior Art

Advanced electro-optical weapons delivery systems require sophisticated test methods to assure measurement integrity. Techniques are required to confirm accurate ranging of optical radars, proper boresighting of all optical channels, and round trip system performance. A straightforward and convenient means of testing such a system is desirable.

In the past the performance of such systems have been tested primarily by two methods: (1) through the use of a surveyed outdoor optical radar range having targets of known characteristics; and, (2) through the use of an active optical transponder directly coupled to the system undergoing test. Method (1) requires considerable terrain area, a fixed plant, and presents weather and safety problems. Method (2) requires a critical optical interface, particularly with respect to boresighting, and it is difficult for the transponder to simulate the signature of returns from real targets. The magnitude of the transponded returns must be known if the receiver sensitivity contribution to oversall system performance is to be established. Such magnitudes are not readily calibrated at the wavelengths of interest, particularly for short pulses and signal levels close to optical receiver thresholds. Timing of the transponded returns is critical to range accuracy, and it is not straightforward to achieve and maintain the required accuracy using inexpensive radiation sources, for example.

In the more recent past, applicants have devised several versions of a passive optical range simulator employing a coiled length of optical fiber to act as an optical delay medium for acceptance and return of pulsed optical energy to and from the optical radar ranger system undergoing test. Both versions have been used successfully in ranger system production line tests; a first version from mid 1975 until late 1976 and a second version from late 1976 until at least the filing date of the present patent application intended to cover such second version.

The earlier-used version employed a collimator assembly with reflective optics as an optical interface with the ranger system under test, and a relay lens to furnish additional focused demagnification at the fiber coil entrance. An anti-reflection property of the collimator entrance window was relied on for minimizing unwanted reflection of energy back into the input of the system under test. An attenuator stack of flat parallel slightly-tilted glass elements was used in advance of the relay lens for fine adjustment of attenuation. There was no mechanism that established the relationship between the boresight axis of the system under test and that of the collimator/range simulator combination, nor was there one to ensure that the beam system of the system under test fell completely within the clear aperture of the collimator assembly.

SUMMARY OF THE INVENTION

In contrast to the earlier-used version, the present invention requires no collimator assembly or relay lens, and via the adapter member attaches directly to the ranger system undergoing test. This direct attachment greatly simplifies optical alignment procedure and eliminates the risk of vignetting. The focusing lens of the present invention is of wide aperture to focus beams directly on the fiber entrance face.

The tilted-glass-element primary attenuator of the present invention gives a "free space" characteristic to the beam path by the elimination of first surface reflection of energy back into the system under test, and the oppositely-angled flat glass elements of the fine adjustment attenuator prevents unwanted translation of beam position during transit therethrough.

Other features and advantages such as an improved fiber optic delay medium of the present invention will become apparent from following description in detail.

BRIEF DESCRIPTION OF THE DRAWING

The single FIGURE is a schematic representation, partly in outline and party in section, of the improved passive optical range simulator device of the present invention.

DESCRIPTION OF THE PREFERRED EMBODIMENT

Referring to the drawing, the improved passive optical range simulator device of the present invention comprises an adapter member 1 that is contoured to mate with a complementary portion of the optical radar ranger system 2 undergoing test. The adapter 1 is provided with openings 3 to accept locating pins 4 projecting from a forward portion of a housing 5 of the device of the present invention. Construction of the member 1 is such that when in use, a test input aperture for the range simulator device coincides and/or is aligned with the working aperture 7 of the ranger system undergoing test. If the physical characteristics of the tested device become significantly different, the adapter member is changed to suit; so that repeated tests of similar systems may be set up and effectuated expeditiously. From the aperture 7 of the optical radar ranger system undergoing test, pulses of optical laser energy will leave along a boresight axis 8 and will return along a parallel axis 9 or 10 for reentry into the system aperture 7. The other of such parallel axes 9 or 10 may represent a path for input of optical information to a television camera (not shown). Attachment screws 11 affiliated with the adapter member 1 provide for locking the locating pins 4 in the openings 3 when positioned therein. Other securing means (not shown) may be employed for removably attaching the adapter member 1 to the system 2 undergoing test. It will be appreciated that the locating or alignment pins 4 when in position within the adapter member 1 while mounted on the system to be tested, position the simulator device housing 5 such that the beam system of the system 2 falls completely within the clear aperture, thus avoiding vignetting.

All beams to and from the system 2 undergoing test along the axes 8, 9, and 10 are subjected to primary attenuation by a tilted-glass attenuator 12, inclined at 45°, for example, to deflect any first surface reflection downwardly into a radiation absorber consisting of a second parallel titled glass absorber plate 14 affiliated with optical black surfaces 15 and 16 located to absorb the transmitted and reflected components leaving plate 14. This primary attenuator at the input to the simulator device ensures that such device looks like "free space" to the system 2 undergoing test, thus minimizing "main bang" reflected energy which otherwise tends to overload the return input to such system and possible damage to the laser source therein.

All beams along the axes 8, 9, and 10 pass through a focusing lens 17 which transforms such parallel beams to and from the system 2 into corresponding focused beams entering and leaving one end 18 of a coil 19 of optical fiber 20 having a mirror 21 presented to its opposite end 22. Lens 17 must be of good optical quality so that the focused blur circle at the wavelength of interest is small enough to couple efficiently with the end face 18 of the fiber 20, and it is free of chromatic aberration at the wavelengths of the optical energy in the beams handled by the system undergoing test, such as a laser pulse beam for ranging and a visible spectrum beam observed by the television camera. One wavelength for the former and a nominal wavelength for the latter suffices as a practical matter, in most instances. The focal length of the lens 17 is chosen to provide a good match with the numerical aperture of the optical fiber 20 and a sufficiently small diffraction-limited focused spot size at the fiber end 18 for efficient energy coupling. The choice of focal length is frequently a compromise between these two desiderata. Thus for a given laser transmitter beam divergence, focused spot size may be reduced to increase input coupling efficiency by selecting a short focal length, but in doing so, a greater fraction of the available fiber numerical aperture is used for input coupling and correspondingly less is available for output coupling to the system's receiver input. The compromise focal length for one working embodiment has been chosen as eleven inches.

A fine adjustment attenuator assembly 24 is interposed in the optical path between the focusing lens 17 and the fiber end 18. The assembly consists of a pair of oppositely tilted glass attenuator plates 25 and 26 through which the focused beams pass enroute to and from fiber end 18. The tilting prevents first surface reflections from reaching the system 2 undergoing test. The directions of tilt are designed to be self compensating for zero boresight axis displacement. The adjustment provided by the assembly is obtained by virtue of removability and replacement with similar attenuator assemblies of different absorption values.

The fiber end 18 or entrance face is optically polished and embedded in a terminator which comprises a short section of polystyrene tube 30 partially filled with epoxy adhesive 31 in which the fiber end is centrally located. The terminator is carried in a translation member 32 affiliated with adjusting screws 33, 34, and 35, for example, to provide for fiber end position adjustment in three mutually perpendicular directions X, Y, and Z. Compression springs 36 interposed between the housing 5 and the member 32 assure that such member will follow position adjustment of the screws. Guide means for member 32 has not been shown. The X-Y axis adjustments allow the fiber end 18 to be positioned for coincidence with the common focal point of all beams along axes 8, 9, and 10 in the final image plane, and the Z axis adjustment permits fine focus.

The coiled length of optical fiber 20 is typically one half to one kilometer in length, wound on a storage spool 40 as a series of fully interleaved single layer windings using controlled tension to minimize fiber stress and achieve minimum optical loss. The fiber itself, as employed in the aforesaid working embodiment, can be a low-loss step-index type as furnished by Corning Glass Works, for example, and typically exhibits loss of the order of 2.5 db/km at 1064 nanometer wavelength. Core and cladding diameters were 85 and 125 microns, respectively. The numerical aperture fell in the range of 0.14 to 0.18, and pulse disperson rates of 10 nanoseconds per kilometer was typical. The fiber is mechanically protected throughout its length by an elastic urethane "buffer" coating having a nominal thickness of 0.005 inch, which results in an overall fiber diameter of 0.015 inch.

The reflective end of the fiber terminates in a manner substantially identical to that of the end 18 described above, except that the polished fiber end 22 is maintained 0.001 inch away from the surface of the plane mirror 21 by means of a separator (not shown) and such reflective end need not be adjustable. The mirror 21 can exhibit a first surface reflectivity of 99.9% at the wavelength of interest coupled with high transmissivity at visible wavelengths. This aspect allows for reflection of the laser transmitter pulses with small loss, while permitting light to be coupled into the fiber from a bulb or source of visible light 41 directly behind the mirror. It should be noted that attenuators 12, 25, and 26 are selected to be absorptive at the wavelength of interest and relatively transparent at visible light wavelengths. This permits light coupled into the fiber from the source 41 to be viewed on the television monitor of the system undergoing test as such light is emitted from the fiber end face 18. This illuminated fiber end behaves almost as a point source of light, greatly facilitating its positioning on the boresight axis 8 and subsequent fine focus adjustment.

What is claimed is:
1. An improved passive optical range simulator device comprising,
  an adapter member for mechanical fixed-position coupling with an optical radar ranger system having a working aperture means via which incoming and outgoing optical radar beams enter and leave along parallel axes, respectively,
  a housing having a testing aperture means for registry with said working aperture means through affiliation with said adapter member,
  a primary attenuator in said housing having a planar glass primary attenuator plate disposed in the path of said parallel axes at a tilt angle with respect thereto,
  a common refractive focusing lens assembly in said housing in the path of both of said parallel axes for transforming said incoming and outgoing beams between such parallel axes and a focal spot in a common plane,
  an optical fiber coil in said housing having one end for disposition in said common plane in registry with said focal spot and having a reflector at its opposite end for enabling such fiber coil to function as an optical delay medium, said reflector being effective at the wavelength of the optical radar beam and transparent to visible light and a light source behind said reflector to light up the aforesaid one end of said optical fiber for alignment with the aforesaid focal spot, and
  position adjusting means for said one end.
2. The improved passive optical range simulator device of claim 1, wherein the aforesaid optical radar ranger system includes television pickup means having a visible light input beam path terminating at said focal spot.

* * * * *